(No Model.) 2 Sheets—Sheet 1.
C. THERYC.
WHEEL WITH ELECTRICAL MOTOR HUB FOR VEHICLES.
No. 572,036. Patented Nov. 24, 1896.
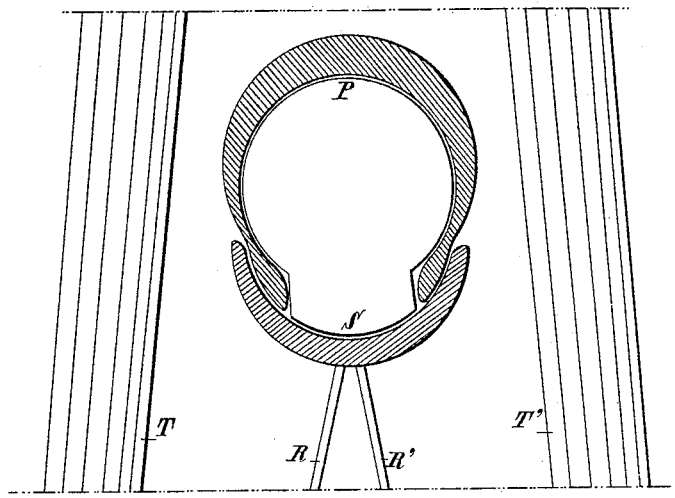
FIG. 1.
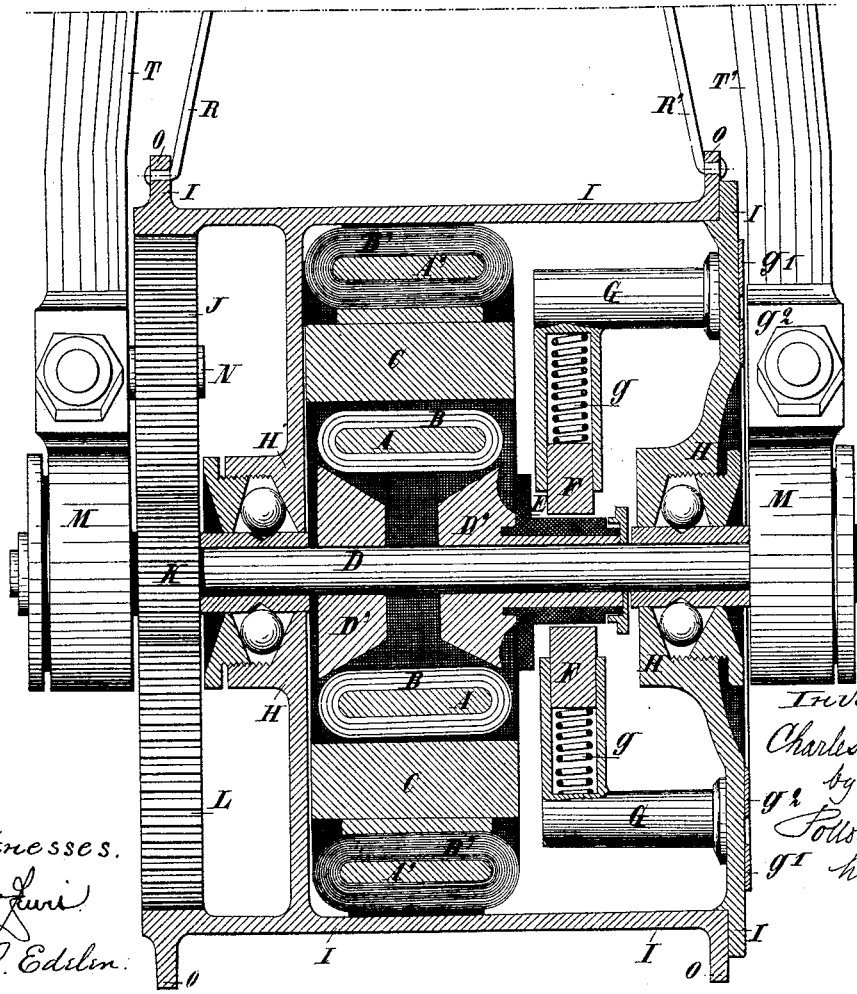
Witnesses.
Inventor.
Charles Theryc
by
his attorney
THE NORRIS PETERS CO., PHOTO-LITHO., WASHINGTON, D. C.

(No Model.) 2 Sheets—Sheet 2.

C. THERYC.
WHEEL WITH ELECTRICAL MOTOR HUB FOR VEHICLES.

No. 572,036. Patented Nov. 24, 1896.

Witnesses.
Reeve Lewis
W. R. Edelen

Inventor.
Charles Theryc
by Pollok & Mauro
his attorneys.

United States Patent Office.

CHARLES THÉRYC, OF MARSEILLES, FRANCE.

WHEEL WITH ELECTRICAL MOTOR-HUB FOR VEHICLES.

SPECIFICATION forming part of Letters Patent No. 572,036, dated November 24, 1896.

Application filed July 31, 1896. Serial No. 601,271. (No model.) Patented in France January 30, 1896, No. 253,580.

*To all whom it may concern:*

Be it known that I, CHARLES THÉRYC, of Marseilles, (Bouches-du-Rhône,) France, have invented certain new and useful Improvements in Wheels with Electrical Motor-Hubs for Vehicles, as clearly described in the following specification, and for which French Patent No. 253,580, of January 30, 1896, has been secured.

The present invention consists in a vehicle-wheel provided with a median electric motor which can be applied to vehicles generally and bicycles in particular. This wheel, which may be of any suitable form, has, as the preceding expression indicates, the electric motor combined with its middle portion in a particular manner, this combination enabling the auxiliary means of transmission actually in use to be dispensed with. The advantage of this arrangement in the interchangeability of these wheels will be at once perceived. Take, for example, a bicycle having for its motor-wheel a wheel constructed in accordance with the present invention and driven by electricity. If at any time it is desired to convert this self-moving bicycle into an ordinary bicycle, it suffices to replace the motor-wheel by an ordinary wheel.

In the following description it will be supposed for facility of description that the improved motor-wheel is applied to a bicycle; but it should be fully understood that the invention is not confined to this sole application, but is intended to be secured for all the uses of which it may be susceptible.

In order to render the explanations which follow as clear as possible, a bicycle-wheel with median electric motor of the present invention is represented by way of example in the accompanying drawings.

Figure 3:
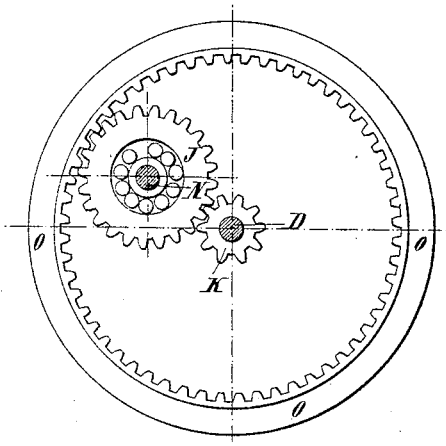
Figure 2:
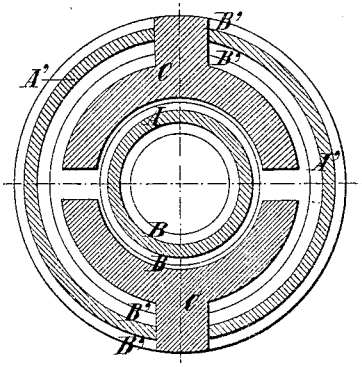
Figure 4:
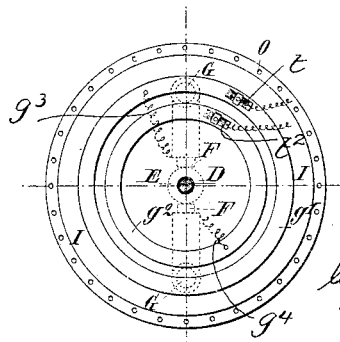

Figure 1 is a section of the wheel and its middle portion in a plane longitudinal of the wheel-axis. Fig. 2 is a section of the median electric motor in a plane transverse to said axis, and Fig. 3 is a detail view of the driving-gear.

At any suitable point on the frame of the bicycle is placed a source of electricity, (a battery, accumulator, &c., not shown,) and this is connected by two conductors with the metal rings $g'$ $g^2$ on one of the faces of the hub or central box I of the wheel, Fig. 1. The electric motor is composed of a dynamo whose armature A B turns in a magnetic field developed by the polar enlargements C. The armature is fast on the axle D of the bicycle-wheel, which is supported, as usual, by the forks T T'. This axle turns freely in two ball-bearing boxes M. The connection of the armature A B with the axle D is effected by two locking-cones D', of insulating material, such as wood, ebonite, &c. The axle D has on one end a pinion K, which engages with an intermediate wheel J, this latter being mounted on ball-bearings on the stud N, supported by the fork T. This intermediate wheel J receives the movement of the pinion K and transmits it to interior toothed wheel L on the circular box I, to the interior of which is fastened the field-magnet A' B'. This box I, to which the field-magnet is fixed, is connected on the one hand with the rim by the spokes R R', whose ends are held in ears $o$, or holes in a flange on the box I, and on the other hand it is mounted on the axle D, about which it turns freely through the medium of the ball-bearing boxes H H'.

The electric conductors which bring the current to the motor descend through the fork T' and terminate in two carbon brushes $t$ $t^2$, secured to the fork, which rub on the concentric rings $g'$ $g^2$, respectively, which are fast on the end of the box I, so as to move therewith. The two rings $g'$ $g^2$ are connected, respectively, with the brush-holders G by conductors $g^3$ $g^4$. The rings are of course insulated from the rest of the box and only deliver the current to the brush-holders G. The brush-holders are in electrical connection with the commutator E of the motor by the carbon brushes or rubbers F, which are pressed against the commutator by the spiral compression-springs $g$.

From the preceding description it will be easily understood that the current coming from any suitable source of electricity on the bicycle and entering the armature by the described connections puts said armature in motion. This communicates its motion through the epicycloidal train K J L in reverse direction to the box I, which carries with it the field-magnet A' B', which is secured thereto, and the rim of the wheel, which is connected therewith by the spokes R R'. In the electric circuit a rheostat may of course be placed with its handle within reach of the rider, so as to enable him to vary the speed of the cycle.

Such is the vehicle-wheel with median electric motor, which constitutes or embodies the present invention. As will be seen, it permits the transformation of a self-moving bicycle or vehicle into a bicycle or vehicle for ordinary traction by the substitution of an ordinary wheel for the wheel with median electric motor.

Take the example of a bicycle, which we will suppose of the most common type with pedals and chain. To transform it at once into a self-moving bicycle of the present system it suffices to remove the rear wheel and replace it by a wheel with median electric motor and to fasten at any point of the frame a source of electricity, (battery, accumulator, &c.) This done, it only remains electrically to connect the source of electricity with the rings $g'$ $g^2$ in order to obtain a self-moving bicycle. The cyclist can then at his pleasure avail himself of the electric power or continue the use of the pedals, which in this transformation have been preserved. The inverse transformation—that is to say, the transformation of the self-moving into an ordinary bicycle—is also simple. It suffices to remove the source of electricity and to replace the wheel with median electric motor by an ordinary wheel.

I claim as my invention or discovery—

In a vehicle-wheel with median electric motor, the combination with the axle having bearings in supports on the vehicle, an armature and a commutator on the axle, a box or barrel hub to which the inner ends of the spokes are connected, having roller-bearings about the axle and forming an inclosure for the motor mechanism, a field-magnet secured to the interior of the hub about the armature, brush-holders on the interior of the hub carrying brushes bearing against the commutator, two metal rings on the exterior of the hub connected respectively with the commutator-brushes, other brushes on the framework of the vehicle bearing respectively against the rings and connected with a source of electricity on the vehicle, a pinion at one end of the axle, an internal rack on the hub, and an intermediate pinion meshing with said pinion and rack and rotating on a journal-pin fixed to the vehicle, substantially as described.

In testimony whereof I have signed this specification in the presence of two subscribing witnesses.

CHARLES THÉRYC.

Witnesses:
 M. CIED,
 CHAS. P. PRESSLY.